United States Patent [19]

Glynn et al.

[11] Patent Number: 5,381,694
[45] Date of Patent: Jan. 17, 1995

[54] ICE THICKNESS MEASUREMENT REFLECTOMETER

[75] Inventors: Dennis P. Glynn, Chester; John C. Joseph, Merrimack; Thomas O. Perkins, Bedford, all of N.H.

[73] Assignee: Dedicated Electronics, Chester, N.H.

[21] Appl. No.: 953,510

[22] Filed: Sep. 29, 1992

[51] Int. Cl.⁶ ............................................. G01B 17/02
[52] U.S. Cl. .................................................. 73/627
[58] Field of Search ................ 73/170.26, 178, 627; 340/580, 582; 244/134 F; 324/643; 367/37

[56] References Cited

U.S. PATENT DOCUMENTS

4,054,255 10/1977 Magenheim ...................... 73/170.26
4,218,678 8/1980 Fowler ................................ 367/37
4,504,833 3/1985 Fowler ................................ 367/37

Primary Examiner—Hezron E. Williams
Assistant Examiner—Christine K. Oda
Attorney, Agent, or Firm—Joseph E. Funk

[57] ABSTRACT

The disclosure defined by this invention utilizes electromagnetic energy reflected from the top and bottom surfaces of ice, the thickness of which is being measured, to determine a phase difference that indicates the thickness of the ice. Since there will be many wave lengths of the electromagnetic energy in the ice, two measurement frequencies are utilized. Integers of wavelengths of each frequency are added to the readings for each frequency to derive sets of numbers. The one number in the set of readings for each frequency that are the same in each set indicate the actual thickness of the ice.

6 Claims, 4 Drawing Sheets

ICE THICKNESS MEASUREMENT REFLECTOMETER

FIELD OF THE INVENTION

The subject invention relates to apparatus for measuring the thickness of a material, and more particularly to an apparatus that uses microwave signals to measure the thickness of materials such as ice and wood.

BACKGROUND OF THE INVENTION

In the prior art there has been a great need for apparatus that can measure the thickness of materials such as ice, wood, stone and concrete. For example, the armed forces have had need to measure the thickness of ice on streams and rivers in the winter to determine if they can drive trucks and even tanks across the ice.

Various techniques have been tried to measure the thickness of materials, but these techniques either have been bulky and expensive, they were inaccurate, or they did not work reliably.

Thus, there is a need for relatively inexpensive and simple apparatus that can measure the thickness of material such as ice, wood, stone and concrete.

SUMMARY OF THE INVENTION

The present invention satisfies the needs of the prior art and provides a relatively inexpensive apparatus that can measure the thickness of material such as ice, wood, stone and concrete. Our invention is basically a special reflectometer.

In the prior art it is known that electromagnetic energy is reflected at the junction of any two materials at which there is a difference in the dielectric constant of the two materials. For instance, with ice over the surface of a body of water, the air above the ice has one dielectric constant, the ice has a second dielectric constant, and the water under the ice has a third dielectric constant. An electromagnetic wave incident to the top surface of the ice has a portion of its energy reflected from the top surface of the ice due to the difference in dielectric constants, and another portion of the electromagnetic wave energy is reflected from the bottom surface of the ice due to the difference in dielectric constants between the ice and the water.

This principle is used in the operation of the present invention which is used to measure the thickness of ice in the preferred embodiment of our invention disclosed herein. However, our novel apparatus may be used to measure the thickness of other materials.

Very basically, our novel apparatus is used to radiate an electromagnetic energy at the top surface of the ice. A portion of the electromagnetic energy is reflected at the top surface of the ice. This reflected signal is combined with the electromagnetic energy reflected at the bottom surface of the ice. The phase of the combined signal is then processed in accordance with the teaching of our invention to determine the thickness of the ice. There may be several thicknesses of ice indicated by a measured phase due to repetitions of the phase of the reflected electromagnetic energy but our novel apparatus is able to determine the correct phase and indicate the correct thickness of ice by utilizing signals having more than one frequency.

Since electromagnetic wave energy travels at different velocities through different materials, the permitivity of the material the thickness of which is being measured must be known to compensate for the difference in velocity of the electromagnetic wave.

By using electromagnetic energy having only one frequency to measure the thickness of the ice the measured phase will indicate multiple possible thicknesses of the ice, so our novel apparatus utilizes two different frequencies and the phase measurements for each frequency are compared in accordance with the teaching of our invention to determine the true thickness of the ice.

DESCRIPTION OF THE DRAWING

The invention will be better understood upon reading the following Detailed Description in conjunction with the drawing in which.

DETAILED DESCRIPTION

Figure 1:
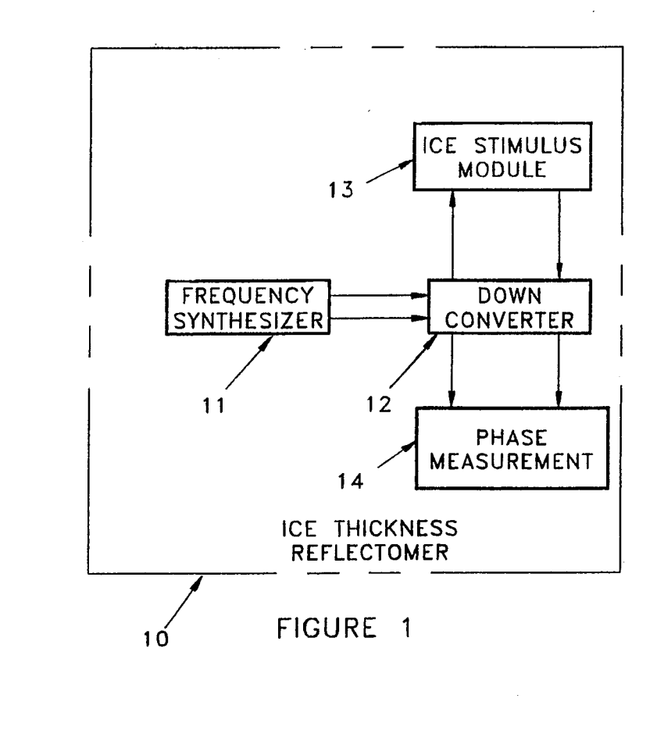
FIG. 1 is a general block diagram schematic of our novel ice thickness measurement reflectometer apparatus.

In FIG. 1 is shown a general block diagram of our novel ice thickness measurement reflectometer 10. There is a frequency synthesizer circuit 11 that utilizes a crystal oscillator driving a phase lock loop circuit to generate the signals needed in operation of our novel apparatus. Downconverter 12 has a phase lock loop circuit to accurately lock the frequency of the signals received after being reflected from the top and bottom surface of ice, the thickness of which is being measured. Ice stimulus module 13 has the microwave antennas used to transmit microwave signals into the ice and receive reflected signals therefrom. Module 13 also has a microwave bridge circuit for isolating the transmitted microwave signal in reflectometer 10 from the received microwave signal. Phase measurement circuit 14 compares the phase of a reference signal with the phase of the signals reflected from the ice to give a phase difference that is corrected to remove signal leakage and phase delay errors and the result is converted to a thickness measurement for the ice.

Two measurement frequencies are utilized in order to remove thickness measurement ambiguities and derive the exact thickness of the ice.

For the operation of our novel reflectometer apparatus microwave frequency energy is chosen over audio frequency energy and optical frequency energy for the following reasons. Audio frequency energy is unsuitable because of the very small rate of change of phase with distance. This is caused by the long wavelengths of audio frequency energy with respect to the thickness of materials being measured which is in the range of two feet. Optical frequency energy is unsuitable for a few reasons. First, it will only work with transparent or translucent materials. Second, its very short wavelength is in the order of the size of air bubbles in many materials such as ice. Energy is reflected by the tiny air bubbles, which are numerous, and accurate readings are virtually impossible to make. Third, there are many wavelengths of optical frequency energy in substances in the range of zero to two feet thickness and ambiguities in thickness measurement are just about impossible to resolve in a simple manner. Similarly, frequencies below the microwave range have wavelengths that are unusable because of the very small rate of change of phase with distance over the range of close to zero feet to two feet.

The preferred embodiment of our invention described in this detailed description is used for measuring the thickness of ice over the range of zero to two feet, but the technique taught herein can be used to accurately measure the thickness of other materials, and materials having greater thicknesses. However, for measuring the thickness of materials other than ice the exact frequencies taught herein must be changed for best results.

Microwave energy having a frequency of about 1 gigahertz is found to be best when measuring the thickness of ice in the range of close to zero feet to two feet. Phase measurement ambiguities are avoided by having the energy traverse less than one half a cycle over the range of thickness of interest, which for our novel ice thickness measurement is between two inches and twenty-four inches.

For frequencies in the order of 1 gigahertz the rate of change of phase with respect to thickness in ice up to two feet is such that a ten degree error in the phase measurement only results in a measurement error of 0.06 inches, which is more than acceptable.

The range of ice thickness that can be measured reliably using a single frequency microwave source in the order of 1 gigahertz is between one-quarter inch and three inches. Measuring thicknesses greater than three inches results in phase differences greater than one-half wavelength. As a result ambiguities arise that must be resolved to accurately measure thickness of ice. To resolve these ambiguities our novel reflectometer apparatus utilizes more than one microwave frequency to resolve the ambiguities and achieve an accurate ice thickness measurement. The choice of the two microwave frequencies determines the exact thickness of ice that may be measured. The thicker the ice to be measured more phase ambiguities arise and more microwave frequencies are required to resolve phase ambiguities.

For any two microwave frequencies utilized, there exists a tradeoff between maximum ice thickness that can be measured and required phase accuracy. The difference between the two frequencies must be decreased to increase the maximum thickness of ice that can be measured, but this results in more stringent phase accuracy. For example, a measurement range of two inches to twenty-two inches has a maximum allowable phase error of six degrees. If it desired to increase both the thickness of ice that can be measured and the maximum allowable phase error more than two frequencies must be used to resolve phase measurement ambiguities.

In accordance with the teaching of our invention a measurement range of two inches to twenty-four inches with a maximum allowable phase error of no more than four degrees is achieved by utilizing two frequencies in the order of 2 gigahertz and our novel approach using the two frequencies.

Prior to describing the circuitry of our novel reflectometer, its calibration to compensate for various errors is first described. This calibration to correct for errors must be performed just before the apparatus is used to measure the thickness of ice.

The first error to be compensated for in calibration is an internal leakage error introduced by signal leakage from the transmitter to the receiver circuitry of the reflectometer. This internal leakage error must be determined and compensated for in order to get accurate ice thickness measurements. The signal leakage error is measured by pointing the antennas of the reflectometer apparatus toward the sky and taking a phase measurement reading. There is no reflection from the sky so the reading is due only to the internal leakage error. This internal leakage error is then compensated for by vector subtracting the sky measurement data from ice measurement data as described in detail further in this detailed description. More specifically, the internal leakage error readings at the two microwave frequencies utilized by our novel apparatus, as described further in this specification, are stored in memories 56 and 57 in the correction and readout circuitry shown in FIG. 5.

The second error to be compensated for in calibration is a phase delay error that is introduced by characteristics of the transmitter, receiver, antenna, and the air space between the antenna and the top surface of the ice the thickness of which is to be measured. This phase delay error must also be determined and compensated for in order to get accurate ice thickness measurements. To determine the phase delay error measurement, phase difference readings are first taken off a known standard which provides a known response. The standard utilized is a flat, conductive metal plate placed on the ice under the reflectometer apparatus. The reflective phase response should be one-hundred-eighty degrees and any difference from this figure is the phase delay error offset used to compensate ice thickness measurement readings taken with the apparatus as described in detail further in this detailed description. More specifically, the phase delay error readings at the two microwave frequencies utilized by our novel apparatus, as described further in this specification, are stored in memories 58 and 59 in the correction and readout circuitry shown in FIG. 5.

After these calibration steps are performed the reflectometer apparatus may be operated to accurately measure the thickness of ice between two inches and twenty-four inches thick. The resulting phase measurements are then corrected by vector subtracting the sky data and adding the appropriate phase delay error offset. The result are accurate phase measurements at the two frequencies which is then converted into an accurate measurement of the thickness of the ice under the reflectometer apparatus. These corrections are described further in this specification with reference to FIG. 5.

Figure 2:
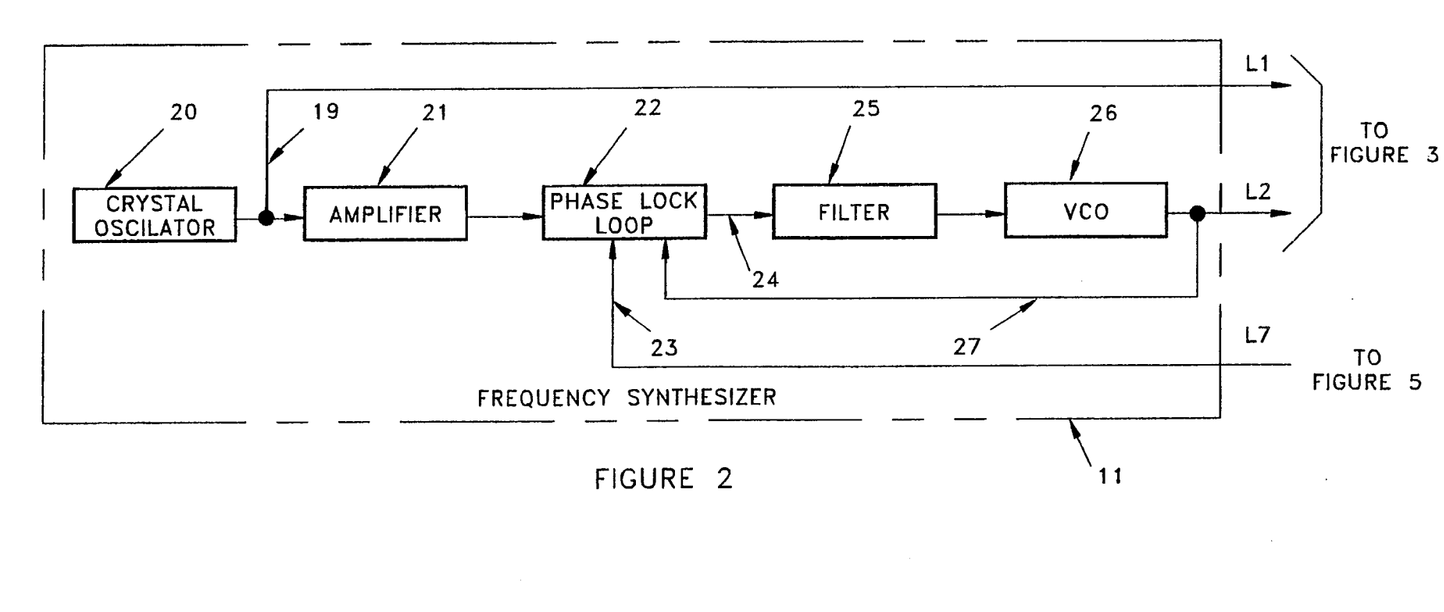
FIG. 2 is a schematic block diagram of a phase lock loop frequency synthesizer circuit used to generate the microwave frequency signals used by our novel reflectometer apparatus.

In FIG. 2 is shown a schematic block diagram of the phase lock loop frequency synthesizer circuit 11 utilized to generate the microwave frequencies used by our novel reflectometer apparatus 10. A reference frequency oscillator 20 comprising a crystal oscillator is used to generate a ten megahertz signal that is fed into an amplifier 21 that saturates and turns the sinusoidal signal output from oscillator 20 into a square wave. The square wave output from amplifer 21 is input to filter 25. A second ten megahertz sinusoidal output 19 from oscillator 20 is input to downconverter 12 via lead L1. Its function and downconverter 12 are described in detail further in this specification.

The ten megahertz square wave is input to phase lock loop (PLL) circuit 22, a Qualcomm Q3036 PLL synthesizer chip available on the commercial market, chosen since it can operate up to 1.6 gigahertz. There is a binary control signal at input 23 to PLL 22 that is used to determine the voltage at its output 24. Control signals at input 23 are generated by processor 62 in FIG. 5 and are applied over lead L7 to input 23. The control signals comprise a first binary number applied to input 23 when the first microwave frequency is to be generated, and a second binary number applied to input 23 when the second microwave frequency is to be generated. The two microwave frequencies are those used in making phase measurements as briefly described above. The first binary number causes a first voltage to be applied to output 24 and the second binary number causes a second voltage to be applied to output 24.

Figure 5:
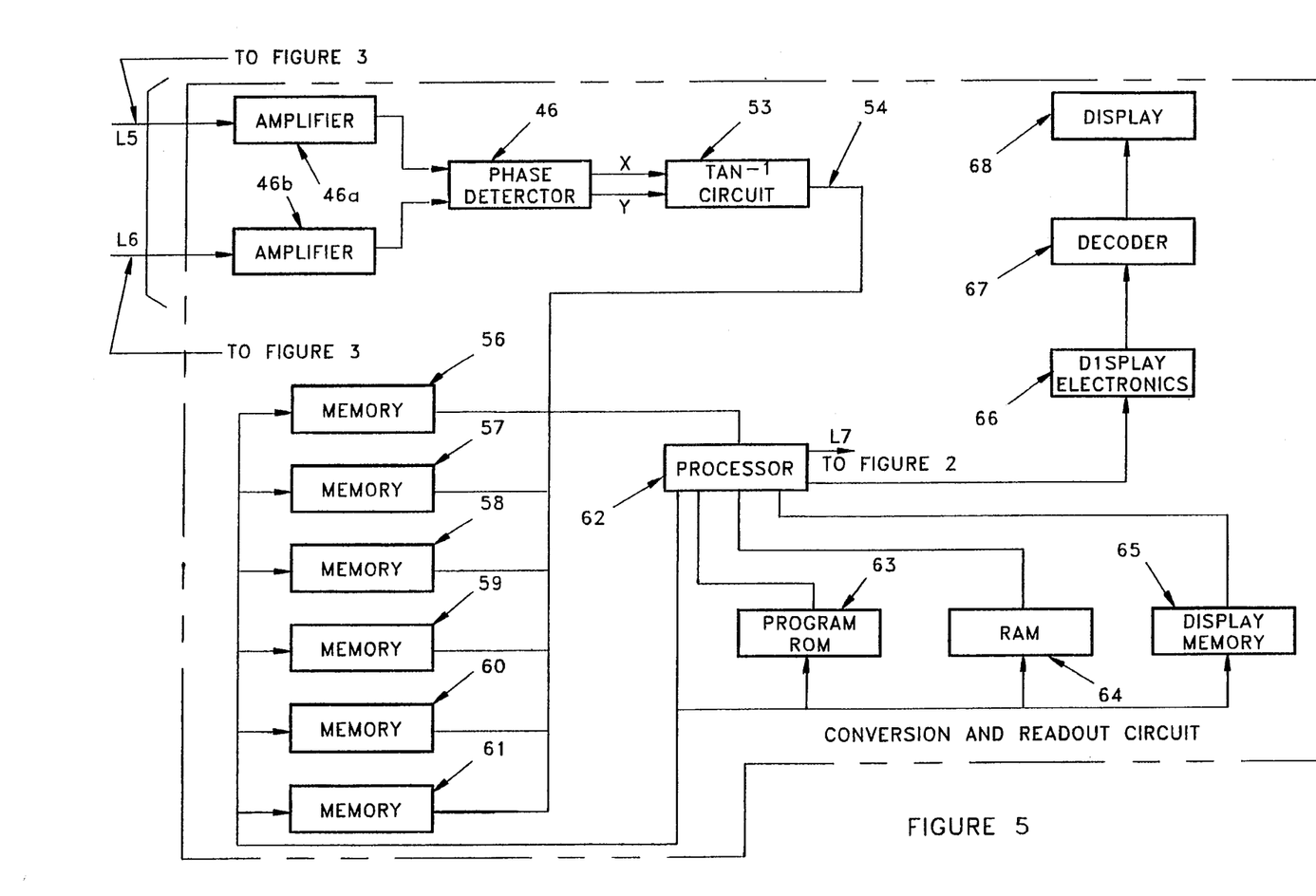
FIG. 5 is a schematic block diagram of the conversion and readout circuitry.

The two binary numbers applied to control input 23 of PLL 22 are generated by processor 62 in FIG. 5. The first binary number causes the 1.1 gigahertz signal to be output from VCO 26, while the second binary number causes the 1.2 gigahertz signal to be output from VCO 26. In operation of the thickness measurement apparatus first the 1.1 gigahertz signal is output from VCO 26, and after this frequency is used in reflection phase measurements the 1.2 gigahertz signal is output from VCO 26 and additional phase measurements are taken. Thus, the two binary numbers input to phase lock loop 22 are switched to its control input 23 one at a time.

The voltage at output 24 of PLL 22 is applied through a low-pass filter 25 made from an operational amplifier which is set up to operate as a low frequency loop filter that passes only lower frequencies in a manner well known in the art. The output from amplifier/filter 25 is input to a voltage controlled oscillator (VCO) 26. VCO 26 is a commercially available Vari-L 800 MHz to 1600 MHz voltage controlled oscillator. The voltage output from amplifier 25 determines the frequency of the signal output from VCO 26. The signal output from VCO 26 is alternatively the 1.1 gigahertz and 1.2 gigahertz signals utilized by our novel reflectometer apparatus. The 1.1 gigahertz and 1.2 gigahertz signals output from VCO 26 are input to downconverter 12 via lead L2.

A portion of the output signal from VCO 26 is applied as a feedback signal to PLL 22 via lead 27. This feedback signal is divided down to a lower frequency signal internal to PLL 22 under control of the binary number applied to input 23 and is then applied to a phase/frequency detector along with the signal from crystal oscillator 20. The phase/frequency detector compares the two signals and outputs a varying voltage that changes to lock the frequency at the output of VCO 26 at either 1.1 gigahertz or 1.2 gigahertz signal as determined by the binary number input to control input 23.

Figure 3:
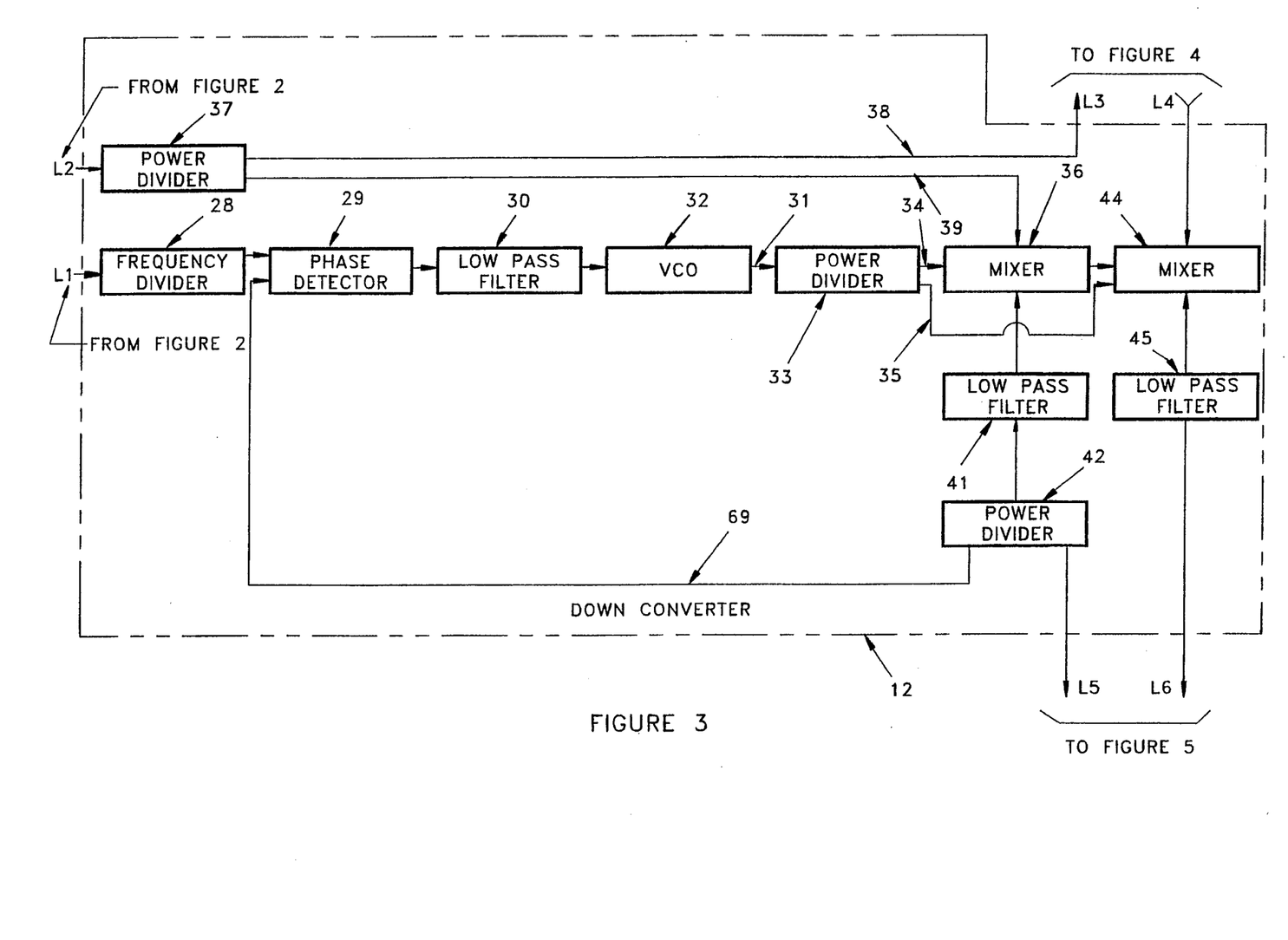
FIG. 3 is a schematic block diagram of a downconverter circuit used to convert received microwave signals to an intermediate frequency for phase measurement in our novel reflectometer apparatus.

In FIG. 3 is shown a detailed block diagram of downconverter circuitry 12 of our novel reflectometer apparatus. The ten megahertz signal on output 19 from oscillator 20 (FIG. 1) is input via lead L1 to frequency divider 28 which divides the ten megahertz signal by ten and provides a one megahertz output signal to one of two inputs to phase detector 29. Phase detector 29 also has a second input at which is input a one megahertz feedback signal used to lock the phase of a phase lock loop. The source of the feedback signal at the second input to phase detector 29 is described in greater detail further in this specification. A signal output from phase detector 29 has a very low frequency varying in accordance with the phase difference between the one megahertz signals at its two inputs. This very low frequency signal output is applied to a low pass filter 30 which is built around an operational amplifier 31 in a manner well known in the art. Low pass filter 30 filters from the signal output from phase detector 29 any frequency components greater than one kilohertz.

The signals output from low pass filter 30 are input to a voltage controlled oscillator (VCO) 32. The frequency of the signal on output 31 from VCO 32 is either 1101 megahertz or 1201 megahertz. When the signal output from VCO 26 in FIG. 2 is 1.1 gigahertz (1100 megahertz) the frequency of the signal on output 31 from VCO 32 is 1101 megahertz, and when the frequency of the signal from VCO 26 in FIG. 1 is 1.2 gigahertz (1200 megahertz) the frequency of the signal on output 31 from VCO 32 is 1201 megahertz.

The signal output from VCO 32 is divided by power divider 33 and is applied to its two outputs 34 and 35. As may be seen in FIG. 3, output 34 is connected to one input of a mixer 36, while output 35 is connected to one input of a mixer 44.

Output lead L2 of VCO 26 in FIG. 2 has on it a sinusoidal signal with either a frequency of 1.1 gigahertz or 1.2 gigahertz as previously described with reference to FIG. 2. This output is connected via lead L2 to the input of power divider 37 as shown in FIG. 3. There are two outputs from power divider 37. Output 38 from power divider 37 is connected via lead L3 to ice stimulus module 40 and thence to the transmitting antenna, and output 39 from power divider 37 is connected to a second input of RF mixer 36.

When the frequency of the signal on lead L2 from VCO 26 in FIG. 2 is 1.1 gigahertz (1100 megahertz), the frequency of the signal on output 31 from VCO 32 is 1101 megahertz; and when the frequency of the signal on lead L1 from VCO 26 is 1.2 gigahertz (1200 megahertz), the frequency of the signal on output 31 from VCO 32 is 1201 megahertz. The 1100 megahertz or 1200 megahertz signal at output 39 from power divider 37 is input to one of the two inputs of RF mixer 36. The other input to RF mixer 36 receives the 1101 megahertz or 1201 megahertz signal at output 34 from power divider 33. Since the signal on output 39 of power divider 37 is sourced from VCO 26 in FIG. 2, and VCO 26 and VCO 32 are phase locked to the same reference oscillator, the signal on output 39 is phase locked to the signal on output 34 of power divider 33.

RF mixer 36 generates the original, sum and difference of the microwave frequency signals applied to its two inputs. The difference frequency is always one megahertz. The output from mixer 36 is input to low pass filter 41 which filters out the two input frequencies to mixer 36 and the sum of the two input frequencies, and passes only the difference frequency which is one megahertz. The one megahertz signal output from low pass filter 41 is phase coherent with the signal output from VCO 26 in FIG. 2.

The one megahertz signal output from low pass filter 41 is input to power divider circuit 42 which provides a first output having a one megahertz frequency via lead L5 to phase measurement circuit 14 in FIG. 5. The second output from power divider circuit 42 is fed back via lead 69 to the second input of phase detector circuit 29 as a feedback signal to cause the phase lock loop to lock to the phase of the signal coming from frequency synthesizer 11 in FIG. 2. While the phase lock loop circuit 22 in FIG. 2 accurately locks the frequency of frequency synthesizer 11, the second phase lock loop circuit in FIG. 3 utilizing phase detector 29 accurately locks the phase of the one megahertz signal output from the phase lock loop to power divider 42. The signal output from the first output of power divider 42 is fed back via lead 69 to phase detector 29 and is used to accurately lock the phase, while the signal output from the second output of power divider 42 on lead L5 is used as a reference signal by phase measurement circuit 14 in FIG. 5 to accurately measure the phase difference introduced into the microwave signals transmitted and reflected from the ice.

Figure 4:
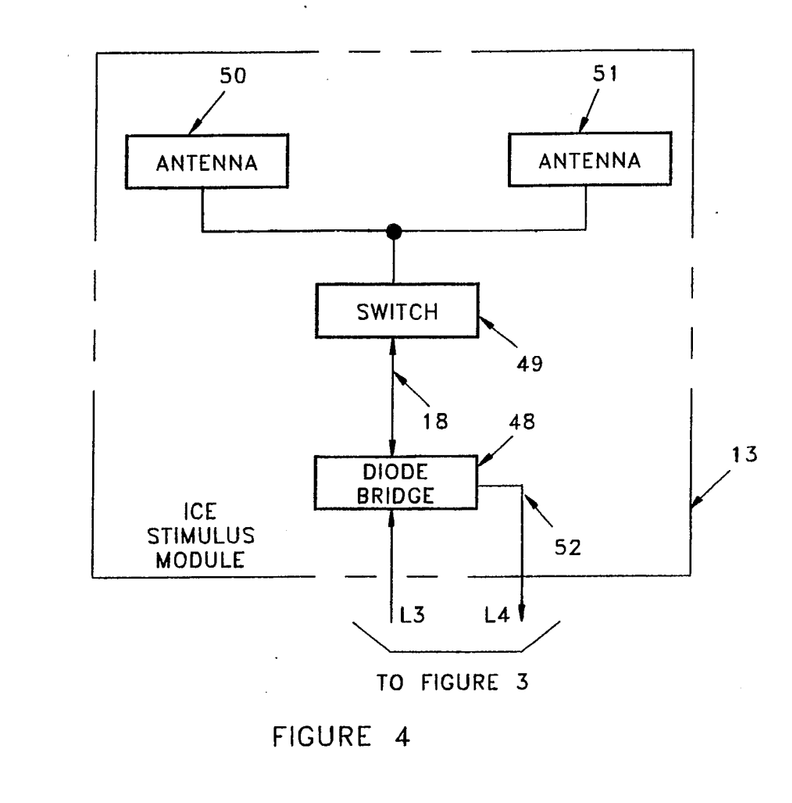
FIG. 4 is a schematic block diagram of the phase measurement circuit of our novel reflectometer apparatus.

In FIG. 4 is shown ice stimulus module 13. The 1100 megahertz or 1200 megahertz signal on output 38 from power divider 37 is input via lead L3 to one port of a microwave diode bridge 48 in ice stimulus module 13 shown in FIG. 4. Another port 18 of diode bridge 48 is connected to a microwave switch 49. Switch 49 is used to connect the diode bridge to one or the other of microwave antennas 50 and 51. Antenna 50 is fine tuned to the frequency of 1.1 gigahertz, and antenna 51 is fine tuned to the frequency of 1.2 gigahertz. The microwave signal (1.1 gigahertz or 1.2 gigahertz) from power divider 37 to be transmitted toward and into the ice passes through microwave bridge 48 to microwave switch 49. When the microwave signal passing through microwave bridge 48 is 1.1 gigahertz, switch 49 switches the signal to antenna 50; and when the signal passing through bridge 48 is 1.2 gigahertz, switch 49 switches the signal to antenna 51.

The antennas are each utilized for both transmitting and receiving purposes. The 1.1 gigahertz measurement signal is transmitted and received by antenna 50, and the 1.2 gigahertz measurement signal is transmitted and received by antenna 51. Microwave diode bridge 48 is used in a manner well known in the art to permit a signal entering the bridge on one port to pass through the bridge and exit at a second port, but a signal entering the bridge on the second port cannot exit at the first port. The signal entering at the second port can exit at a third port. The operation permits isolating the transmitter circuitry from the receiver circuitry. Stated another way, the received signal is blocked from returning via bridge 48 to power divider 37 in the transmitter circuitry. Instead, the received microwave signal exits bridge 48 at port 52 and passes via lead L4 to mixer 44 in FIG. 3 after being amplified (amplifier not shown).

Microwave antennas 50 and 51 are both circular microstrip patch antennas with parasitic directors and are widely used in the microwave art. This type of antenna was chosen for its performance, small size, low weight, and low cost.

The microwave signal reflected at the junction of air and ice, and at the junction of ice and water is received by the appropriate one of the antennas as described above. The received signal passes back through microwave bridge 48 via port 18, port 52, and lead L4 to an amplifier (not shown) and thence to mixer 44 in downconverter 12 in FIG. 3. The amplified, received signal applied to one of two inputs of RF mixer 44 is mixed with the divided signal on output 35 from power divider 33. The output signals from RF mixer 44 include the two input frequencies and the sum and difference of the two input frequencies as is well known in the art.

When the frequency of the signal output from VCO 26 in FIG. 2 is 1.1 gigahertz (1100 megahertz), the frequency of the signal output from VCO 32 is 1101 megahertz; and when the frequency of the signal output from VCO 26 is 1.2 gigahertz (1200 megahertz), the frequency of the signal output from VCO 32 is 1201 megahertz. The reflected and received microwave signal is 1100 megahertz when the signal output from VCO 32 and power divider 33 is 1101 megahertz, and the reflected and received microwave signal is 1200 megahertz when the signal output from VCO 32 and power divider 33 is 1201 megahertz. As a result, the difference frequency output from RF mixer 44 is 1 megahertz. The output from mixer 44 is input to low pass filter 45 which only permits the 1 megahertz difference frequency to pass through the filter. While the frequency of this signal is 1 megahertz, the phase shift introduced by reflection at the top and bottom surfaces of the ice is carefully preserved.

The second input to mixer 44 is either the 1101 megahertz or 1201 megahertz signal with carefully locked phase output from power divider 33. RF mixer 44 mixes these two signals and generates the original, sum and difference of the two microwave signals applied to its inputs. The difference frequency is always one megahertz. The output from RF mixer 44 is input to low pass filter 45 which filters out the two input frequencies to mixer 44 and the sum frequency of the two input frequencies, and passes only the difference frequency which always has a frequency of one megahertz. However, any phase difference caused by the distance travelled by the transmitted signal and reflected at the upper and lower surfaces of the ice is carefully retained.

The one megahertz signal output from low pass filter 45 is input via lead L6 to phase measurement circuit 14 (FIG. 5) to be compared with the one megahertz reference signal on lead L5 whose phase has been carefully maintained. The signal output from phase detector circuit 46 is a signal indicating the phase difference between the reflected signal and the reference signal. Thus, in brief summary, there is a 1 megahertz reference signal input to phase detector circuit 46 from power divider 42, and there is a 1 megahertz measurement signal input to phase detector circuit 46 from low pass filter 45. While these two signals have the same frequency they differ in their phase, and this phase difference represents the thickness of the ice being measured plus errors that were previously described. These errors are the phase delay and internal leakage errors that are determined during initial calibration and are used to correct the measured phase delay to get a resultant phase delay that accurately indicates the thickness of the ice being measured.

In FIG. 5 are shown the conversion and readout circuits. It may be seen that the reference and measurement signals are first amplified by RF amplifiers 46a and 46b before being input to phase detector 46. Phase detector 46 is a quadrature phase detector of a type well known in the art and is specifically designed to operate with two input signals each at 1 megahertz. In response to the reference and measurement input signals, phase detector 46 generates two DC voltage output signals representative of the phase difference of the two signals at its inputs. The two output signals are DC voltages representing the X and Y components of the angle representing the phase. More specifically, the ratio of the Y component to the X component, that is Y/X, defines the tangent of the phase difference measured in degrees.

The X and Y components output from quadrature phase detector 46 are input to an arc tangent circuit 53, also well known in the art, that takes the X and Y components and provides a binary output signal 54 representing the angle of the phase difference.

The previously described internal leakage error readings for 1.1 and 1.2 Gigahertz are stored in memories 56 and 57 under control of processor 62 which executes the control program stored in program ROM 63. Memory 56 is used to store the leakage error reading for the 1.1 Gigahertz measurement signal, and memory 57 is used to store the leakage error reading for the 1.2 Gigahertz measurement signal. Similarly, the phase delay error measurement made using the conductive plate are stored in memories 58 and 59. Memory 58 is used to store the phase delay error reading for the 1.1 Gigahertz measurement signal, and memory 59 is used to store the phase delay error reading for the 1.2 Gigahertz measurement signal.

Ice thickness measurement readings are then taken and stored. The phase reading for the 1.1 Gigahertz measurement signal is stored in random access memory 60, and the phase reading for the 1.2 Gigahertz measurement signal is stored in random access memory 61.

After an ice thickness measurement reading is taken at each of the two measurement frequencies (1.1 Gigahertz and 1.2 Gigahertz) processor 62, under control of the program stored in program ROM 63, measures the thickness of the ice using the two phase measurement readings, the two leakage error (sky measurement) readings, and the two phase delay error (metal plate) readings.

The first step in the measurement of the thickness of the ice is to solve the following equation using the data stored in memories 56, 57, 58, 59, 60 and 61. The equations solved by processor 62 under control of the program stored in program memory 63 for each of the measurement frequencies (1.1 Gigahertz and 1.2 Gigahertz) are:

At 1.1 Gigahertz

Ice Thickness Phase =

$$-\frac{(\text{ice measurement} - \text{leakage error measurement})}{(\text{phase delay measure} - \text{leakage error measurement})}$$

At 1.2 Gigahertz

Ice Thickness Phase =

$$-\frac{(\text{ice measurement} - \text{leakage error measurement})}{(\text{phase delay measure} - \text{leakage error measurement})}$$

Subtracting the leakage error (sky) measurement from the ice measurement yields a corrected ice measurement by correcting for antenna mismatch. Subtracting the leakage error (sky) measurement from the phase delay measurement yields a corrected phase delay measurement. By dividing the corrected ice measurement by the negative of the corrected phase delay measurement a reference of zero decibels and zero degrees is calculated at the surface of the ice, the thickness of which is being measured. The results of the calculations are stored in random. access memory 64.

As previously described, for each frequency used to measure the thickness of the ice, the measured phase indicates more than one possible thickness of the ice. When using two different frequencies the phase measurement for each frequency indicates two possible sets of ice thicknesses. These possible sets of ice thickness are different except for one reading in each set which are identical. It is this phase that indicates the actual thickness of the ice. The ice thickness is represented by the length of some number of cycles or fractions of cycles (phase) of the measuring frequencies.

Processor 62, under control of the program stored in program memory 63, uses the ice thickness phase measurements calculated by processor 62 using the above described equations and stored in RAM 64 to calculate a set of possible thicknesses of the ice. This is done by adding integer numbers of wavelengths to each calculated ice thickness phase. At 1.1 Gigahertz the integers 3, 6, 9, and 12 are added to the phase measurement. At 1.2 Gigahertz the integers 2.75, 5.50, 8.25 and 11.0 are added to the phase measurement. Each set is stored in RAM memory 64. RAM 64 is used by processor 62 to store data and the results of its calculations.

Processor 62 then compares the two sets of possible ice thicknesses (measured as phase) stored in RAM 64 to identify the one figure in each set that is identical. This represents the actual thickness of the ice being measured. Processor 62 converts the phase for the one ice thickness phase measurement into a binary number representing inches and stores it in display memory 65 from which it is applied via processor 62 to display electronics 66, is then decoded by decoder 67 and input to LCD display 68 to provide a visual display of the ice thickness in inches.

While what has been described herein is the preferred embodiment of the invention, it will be understood by those skilled in the art that many changes may be made without departing from the spirit and scope of the invention. For instance more than two frequencies may be utilized in making measurement readings on thicker materials to resolve thickness measurement ambiguities. In addition, the thickness of materials other than ice may be measured.

What is claimed is:

1. Apparatus for measuring the thickness of a material comprising:

oscillator means alternately generating a first signal having a first frequency and a second signal having a second frequency; antenna means coupled to said oscillator means for transmitting into said material, the thickness of which is being measured, said first signal and then said second signal, and said antenna means receiving a portion of said first signal that is reflected from said material and then a portion of said second signal that is reflected from said material;

phase detecting means coupled to said antenna means for detecting a first phase difference between the portion of said first signal reflected from said material and said first signal from said oscillator means and providing a first indication of said first phase difference, and then detecting a second phase-difference between the portion of said second signal reflected from said material and said second signal from said oscillator means and providing a second indication of said second phase difference;

processor means receiving said first indication of said first phase difference from said phase detecting means and determining a first indication of material thickness therefrom, said processor means adding a first plurality of integers of wavelength of said first frequency to said first indication of material thickness to derive a first set of numbers, and said processor means receiving said second indication of said second phase difference from said phase detecting means and determining a second indication of material thickness therefrom, said processor means adding a second plurality of integers of wavelength of said second frequency to said second indication of material thickness to derive a second set of numbers;

memory means coupled to said processor means for storing said first and said second set of numbers, said processor means comparing said first set and said second set of numbers to locate a matching number in said first set of numbers that is also in said second set of numbers, said matching number representing the actual physical distance that said first signal travels in said material and also represents the actual physical distance that said second signal travels in said material; and display means receiving said matching number from said memory means and using same to display the actual thickness of said material.

2. The apparatus in accordance with claim 1 wherein said oscillator means comprises:

a first phase lock loop circuit under control of said processor means for generating said first signal having said first frequency and for generating said second signal having said second frequency.

3. The apparatus in accordance with claim 2 wherein said apparatus further comprises:

a second phase lock loop circuit having a first input, a first output, and a second output having a fourth signal of a fourth frequency thereon when said first signal is being generated by said oscillator means, and having a fifth signal of a fifth frequency thereon when said second signal is being generated by said oscillator means, and said second phase lock loop circuit operates to lock the phase and frequency of said fourth signal on said second output.

4. The apparatus in accordance with claim 3 wherein said phase detecting means comprises:

a first mixing means mixing said fourth signal on said second output of said second phase lock loop circuit with said portion of said first signal that is reflected from said material and received by said antenna means when said first signal is being generated by said oscillator means to produce a sixth signal having a sixth frequency, and for mixing said fifth signal on said second output of said second phase lock loop circuit with said portion of said second signal that is reflected from said material and received by said antenna means when said second signal is being generated by said oscillator means to produce a seventh signal having said sixth frequency.

5. The apparatus in accordance with claim 3 wherein said second phase lock loop circuit comprises:

a second mixing means for mixing said fourth signal on said second output of said second phase lock loop circuit with said first signal when it is being generated by said oscillator means to produce an eighth signal having a seventh frequency, and for mixing said fifth signal on said second output of said second phase lock loop circuit with said second signal when it is being generated by said oscillator means to produce said eighth signal having said seventh frequency.

6. A method of measuring the thickness of a material comprising the steps of:

transmitting a first signal of a first frequency into said material;

receiving a second signal reflected from said material responsive to said first signal, said second signal having said first frequency;

determining a first indication of said material thickness using said first and said second signals;

adding a plurality of integers of wavelength of said first frequency to said first indication of said material thickness to derive a first set of numbers;

storing said first set of numbers;

transmitting a third signal of a second frequency into said material;

receiving a fourth signal reflected from said material responsive to said third signal, said fourth signal having said second frequency;

determining a second indication of said material thickness from said third and said fourth signals;

adding a plurality of integers of wavelength of said second frequency to said second indication of said material thickness to derive a second set of numbers;

storing said second set of numbers;

comparing said first set of numbers and said second set of numbers to locate a matching number in said first set and said second set of numbers, said matching number representing the actual physical thickness of said material; and displaying the thickness of said material using said matching number.

* * * * *